US010605480B1

(12) United States Patent
Des Champs

(10) Patent No.: US 10,605,480 B1
(45) Date of Patent: Mar. 31, 2020

(54) SYSTEMS, DEVICES, AND/OR METHODS FOR MANAGING CONDENSATE

(71) Applicant: Nicholas Howard Des Champs, Fincastle, VA (US)

(72) Inventor: Nicholas Howard Des Champs, Fincastle, VA (US)

( * ) Notice: Subject to any disclaimer, the term of this patent is extended or adjusted under 35 U.S.C. 154(b) by 0 days.

(21) Appl. No.: 16/681,138

(22) Filed: Nov. 12, 2019

(51) Int. Cl.
*F24F 13/22* (2006.01)
*F24F 140/30* (2018.01)
*F16T 1/20* (2006.01)

(52) U.S. Cl.
CPC ............... *F24F 13/222* (2013.01); *F16T 1/20* (2013.01); *F24F 2140/30* (2018.01); *Y10T 137/3068* (2015.04)

(58) Field of Classification Search
CPC ....... F16T 1/20; F16T 1/22; F16T 1/24; F16T 1/26; F16T 1/28; F16T 1/30; F16T 1/305; F16T 1/32; F24F 2140/30; F24F 13/222; F24F 13/224; F24F 2013/225; F24F 2013/227; Y10T 137/3068; Y10T 137/3071; Y10T 137/3074; Y10T 137/3077; Y10T 137/308; Y10T 137/7404; Y10T 137/7485
USPC ....... 137/247.17, 247.19; 210/307, 136, 268, 210/282, 293, 300, 206, 232, 299, 119, 210/121–129; 62/285, 297, 291, 288, 62/303, 279, 373, 272, 290, 281
See application file for complete search history.

(56) References Cited

U.S. PATENT DOCUMENTS

| | | | |
|---|---|---|---|
| 2,277,647 A | 3/1942 | Jones | |
| 4,527,584 A * | 7/1985 | Miller | F16T 1/24 137/192 |
| 4,627,460 A * | 12/1986 | Eising | F01N 3/005 137/192 |
| 5,115,798 A | 5/1992 | Moore | |
| 5,379,749 A | 1/1995 | Rieke | |
| 5,582,159 A | 12/1996 | Harvey | |
| 5,644,925 A * | 7/1997 | Chaves | F24F 13/22 137/192 |
| 5,704,343 A | 1/1998 | Ahn | |
| 6,009,898 A * | 1/2000 | Risch | F02M 35/10255 123/198 E |
| 6,698,225 B2 * | 3/2004 | Chaves | F24F 13/222 137/247.13 |
| 6,823,885 B2 * | 11/2004 | Hotta | F16T 1/20 137/192 |
| 6,895,771 B1 * | 5/2005 | Cantolino | C02F 1/688 62/285 |

(Continued)

OTHER PUBLICATIONS

None, "Carrier Condensate trap", Jan. 30, 2018, 1 page, https://www.zoro.com/carrier-condensate-trap-319830-402/i/G5562280/ . . . 2 of 4.

(Continued)

*Primary Examiner* — Craig J Price
(74) *Attorney, Agent, or Firm* — Michael Haynes PLC; Michael N. Haynes

(57) ABSTRACT

Certain exemplary embodiments can provide a system, machine, device, and/or manufacture that is configured for operably releasing condensate from a condensate-producing unit without allowing a substantial quantity of gas to enter the condensate-producing unit and/or a substantial quantity of gas to flow through the system, machine, device, and/or manufacture.

24 Claims, 8 Drawing Sheets

(56) References Cited

U.S. PATENT DOCUMENTS

| | | | | |
|---|---|---|---|---|
| 6,931,882 B1* | 8/2005 | Yang | ................... | F16T 1/22 |
| | | | | 62/285 |
| 7,578,932 B2* | 8/2009 | Cantolino | ............... | F25D 21/14 |
| | | | | 137/268 |
| 7,854,238 B2* | 12/2010 | Zatarain | ................ | F25D 21/14 |
| | | | | 137/247.11 |
| 8,056,553 B2 | 11/2011 | Khan | | |
| 8,555,915 B2 | 10/2013 | Brunner | | |
| 10,488,088 B2* | 11/2019 | Verma | ................... | F16T 1/24 |
| 2005/0155535 A1 | 7/2005 | Rieke | | |
| 2011/0174202 A1 | 7/2011 | Gedcke | | |
| 2011/0174461 A1 | 7/2011 | Kowald | | |

OTHER PUBLICATIONS

None, "Lennox Condensate Drain Trap", Jan. 30, 2018, 1 page(s), https://www.zoro.com/lennox-condensate-drain-trap-61m35/i/G5560628/ 2 of 4.

* cited by examiner

SYSTEMS, DEVICES, AND/OR METHODS FOR MANAGING CONDENSATE

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DRAWING KEY

Figure 1:
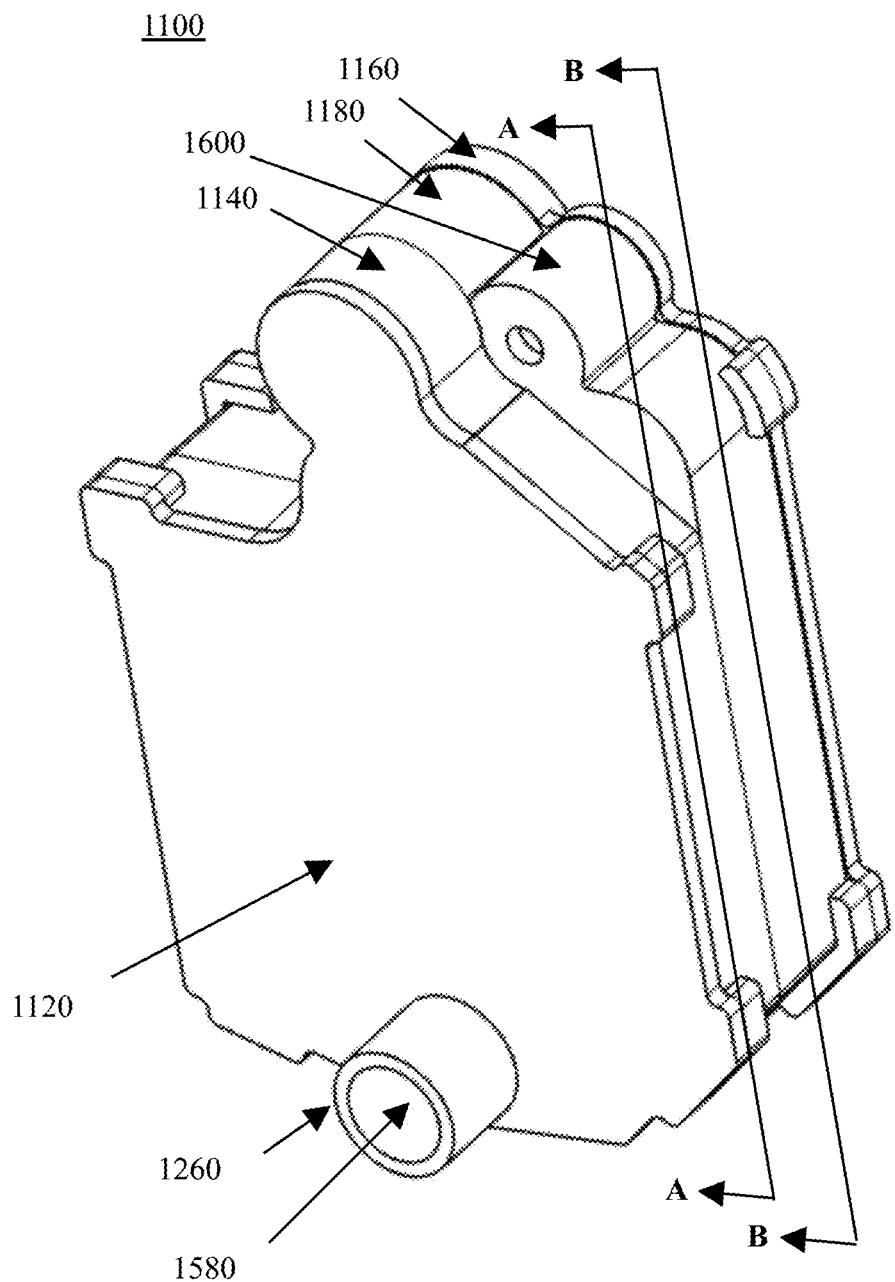
FIG. 1 is a front perspective view of an exemplary embodiment of a condensate management trap.

| Element Name | Element Number |
|---|---|
| Condensate management trap | 1000 |
| Trap body | 1100 |
| Front face | 1120 |
| Front portion | 1140 |
| Back face | 1160 |
| Back portion | 1180 |
| Positive input | 1220 |
| Negative input | 1240 |
| Drain conduit | 1260 |
| Positive chamber | 1320 |
| Positive float | 1340 |
| Positive float sealing surface | 1350 |
| Positive float stop | 1360 |
| Positive float rotational axis | 1380 |
| Collection chamber | 1420 |
| Collection chamber bottom | 1430 |
| Negative float | 1440 |
| Negative float sealing surface | 1450 |
| Negative float stop | 1460 |
| Negative float guide rail | 1480 |
| Negative chamber | 1490 |
| First port | 1540 |
| First port seat | 1542 |
| First port central axis | 1544 |
| Second port | 1560 |
| Second port seat | 1562 |
| Third port | 1580 |
| Mount | 1600 |

DESCRIPTION

Certain exemplary embodiments relate to the technical field of heating, ventilating, and air conditioning ("HVAC").

Certain exemplary embodiments involve "traps" that allow condensate to drain from a condensate source, such as an HVAC, air conditioning, ice-making, dehumidifying, and/or other condensate-producing unit, and simultaneously prevent a gas, such as ambient air, conditioned air, combustion gas, and/or drain gas from entering and/or escaping from the unit. Note that as used herein, "gas" need not be limited to any particular gas, but instead can be or include vapors, liquids, and/or solids, etc., such as any form of air, conditioned air, combustion gas, drain gas, smoke, steam, refrigerant, dust, etc.

As an example, certain exemplary embodiments are in the technical field associated with a condensate-producing unit that has a cooling coil to cool air going to and/or within a building. Note that as used herein, "air" need not be pure air, but instead can be or include vapors, liquids, and/or solids, etc., other than pure air, such as smoke, steam, refrigerant, dust, etc. During warm periods, the cooling coil can generate condensate (which herein will often be referred to as "water", although the condensate need not be water, and any water need not be pure (e.g., it can contain a refrigerant, minerals, dust, and/or debris, etc.)). More particularly, certain exemplary embodiments are in the technical field of a condensate drainage system that allows removal of water from a condensate-producing unit while simultaneously preventing the passage of air to or from the unit.

In certain exemplary embodiments, a device, referred to herein as an "air trap" or "condensate management trap", can use a pressure, such as that generated by an air moving device(s) within a condensate-producing unit, to prevent unwanted gasflow in or out of the condensate-producing unit via the condensate drain lines. Thus, for example, an air trap can use air pressure to help "trap" airflow.

Certain exemplary embodiments need not require standing water to prevent gas from entering and/or leaving a condensate-producing unit. With the occurrence of condensate within the unit, the condensate can flow out of the unit toward the trap but without escape and/or entry of a substantial quantity/volume/flow of gas from/to the unit. When there is no condensate produced, there can be essentially no liquid remaining in the trap yet there can be substantially no gas flowing through the trap to or from the condensate-producing unit.

As another example, certain exemplary embodiments can involve condensate-producing gas furnaces, such as those used for home heating. Certain gas-fired home heating furnaces can have a thermal efficiency greater than 90 percent. To achieve this high efficiency the combustion products typically must have latent energy as well as sensible energy removed and/or transferred to the re-circulated air used to heat the space. The energy transfer process can take place first in a metal air-to-air heat exchanger, where approximately 70 percent of the energy can be removed, and then within a corrosion-resistant heat exchanger, or 2nd stage heat exchanger, where sensible and/or latent energy can be removed from the cooler combustion products. When latent energy is removed from a gas stream, moisture can condense on the combustion air side of the heat transfer surface. This condensation typically collects at or near the outlet of the 2nd stage.

An induction fan can be necessary to induce the combustion products to flow through the first and second stage heat exchangers and then to blow the cooled combustion products through the exhaust vent tube to ambient. Because the temperature surrounding the vent tube can be lower than the dew point temperature of the combustion products, condensation can form within the pressurized vent tube. Thus, condensation can arise from two sources; the heat exchangers and the exhaust vent tube (herein after referred to as simply "vent tube"). Due to the action of the induction fan pulling combustion gases from the heat exchangers, condensate collected from the heat exchangers is often surrounded by a negative gas pressure (with respect to ambient air pressure and/or the pressure on the downstream side of the induction fan). Likewise, due to the action of the induction fan pushing combustion gases through the vent tube, condensate collected from the vent tube is often surrounded by a positive pressure (with respect to ambient and/or the upstream side of the induction fan).

The condensate formed within the 2nd stage condensing heat exchanger and/or within the vent tube can be collected and/or directed to one or more condensate drains, which can be subject to ambient air pressure. To remove condensate from a combustion gas containment system and/or more generally, a condensate-producing unit, a device known as a "P-trap" can be used. When properly designed and operating in a combustion gas containment system, a P-trap can allow condensate to exit the combustion gas containment system while preventing air from entering (when the combustion gas containment system is at negative pressure) or combustion gas from leaving (when the combustion gas containment system is at positive pressure). More generally, when properly designed and operating in a condensate-producing unit, a P-trap can allow condensate to exit the positive side while preventing positively-pressured gas from leaving and/or can prevent ambient and/or drain gas from entering the condensate-producing unit when the unit is at negative pressure.

There can be several challenges, however, with using a P-trap for this application:
  standing water can be required within the P-trap and that water can be prone to freezing if the condensate-producing unit is installed in an unheated space such as an attic or a cottage that sees intermittent use during the heating season;
  to maintain a sufficient water level to allow the P-trap to operate properly at beginning of the heating season and/or the cooling season, the trap typically must be very deep, which can lead to sludge buildup and/or an even greater chance of freezing;
  to handle a large pressure differential between the low pressure and high pressure sides of the condensate-producing unit (e.g., between the inlet and outlet of the fan), a P-trap would need to extend well below the condensate pan and even the frame of the condensate-producing unit, and possibly a substantial distance into the floor that supports the condensate-producing unit; and/or
  designing two separate traps into a compact unit that is designed to handle the two condensate sources (one at a positive pressure and the other at a negative pressure) can be undesirable from the perspective of cost, space, installation, and/or maintenance, etc.

Our attempts to solve the problems associated with using P-traps for this application have presented several further challenges. For example, P-traps can require a relatively large reservoir of liquid stored within the trap in order to prevent gas from entering or from leaving the condensate-producing unit. This large amount of liquid, in many installations, can be prone to freezing. The resulting ice can prevent the condensate-producing unit from restarting on call for heat, which can further result in the unit never restarting and becoming useless for generating the heat to melt the ice.

As another example, when the furnace and/or condensate-producing unit is first installed and/or at the beginning of a heating season, it is highly likely that the fluid in the reservoir is nonexistent or has receded to a level that permits gas, such as conditioned air or combustion gas, to flow from the positive pressure side of the fan, through the interstices of the trap, and into the negative pressure side, for example, entering at the lowest portion of the 2nd stage drain pan. In this example, because the pressure differential between the gas entering and leaving these two flow points can be approximately 1.5 inches to approximately 11.5 inches, the gas flow entering the 2nd stage drain pan can be sufficiently high that it can prevent condensate from exiting the pan. Instead of exiting, the condensate attempting to exit can form a small geyser, leading to condensate build up and/or spraying of water around the inner walls of the unit. This phenomenon can continue until the condensate arriving at the trap from the exhaust vent is sufficient to fill the trap to a level that prevents gas bypass within the trap. It is possible that the condensate level in the 2nd stage heat exchanger rises to a level that some of the tubes become filled, which can cause an increase in pressure drop leading to a decrease in gas airflow. This in turn can shut down the unit. In other words, a catch-22 can exist with certain designs. The trap typically requires a certain level of water to be in trap at all times but the water can be prone to freezing.

Attempting to address this conundrum, certain exemplary embodiments can accomplish the functions desired for a condensate management trap without encountering such challenges. Certain exemplary embodiments can deter or prevent:
  gas from entering the positive pressure side of the condensate-producing unit;
  gas, such as conditioned air and/or combustion gas, from leaving the positive pressure side of the condensate-producing unit, and/or
  gas, such as conditioned air, ambient air, drain gas, and/or combustion gas, from entering the negative side of the condensate-producing unit from the ambient and/or positive side;
  all within an extremely compact design that potentially can remain in a vertical orientation and mounted internal of the unit housing even though the condensing unit may be mounted vertically with upward flow, vertically with flow downward, or on its side with horizontal combustion gas flow.

Certain exemplary embodiments can provide a condensate management trap or air trap that is configured to operate dry when the condensate-producing unit is not operating. Certain exemplary embodiments can provide a condensate management trap that, when the unit is operating, allow condensate to flow from a point of condensate generation within the unit, through the trap, and to a drain, such as a house gutter, a roof drain, a sewer, and/or a ground level storm drain, while simultaneously deterring and/or not allowing positively pressured gas to flow out of the unit's positively pressured side and/or to flow from the high pressure side of the unit (such as downstream of the unit's induction fan) to the low pressure side of the unit (such as upsteam of the unit's induction fan), or for ambient air to be drawn into the negative (such as upstream of the unit's induction fan)

Referring to the various views of FIGS. 1-7, certain exemplary embodiments of a condensate management trap 1000 can include a trap body 1100 that can be defined by a front face 1120, a front portion 1140, a back face 1160, and/or a back portion 1180. In operation, trap body 1100 can define a substantially vertically extending height, a substantially horizontally extending width, and a substantially horizontally extending depth, each of the height, width, and depth orthogonal to each other.

Defined by, connected to, and/or integral to trap body 1100 can be a positive input 1220, a negative input 1240, and/or a drain conduit 1260.

Defined by and/or integral to trap body 1100 can be a positive chamber 1320, contained within which can exist and/or operate a buoyant positive float 1340, a positive float sealing surface 1350, and/or a positive float stop 1360. Positive float 1340 can pivot and/or partially rotate about a positive float rotational axis 1380, which can be defined and/or positioned in part by front face 1120 and/or back face 1160. Positive float 1340 can define a positive float sealing surface 1350 that is configured to form a substantial seal against first port seat 1542, which is defined by a first port 1540 that fluidically connects positive chamber 1320 to collection chamber 1420.

Defined by and/or integral to trap body 1100 can be a collection chamber 1420, contained within which can exist and/or operate a negative float 1440, a negative float stop 1460, and/or a negative float guide rail 1480. Negative float 1440 can define a negative float sealing surface 1450 that is configured to form a substantial seal against second port seat 1562, which is defined by a second port 1560 that fluidically connects collection chamber 1420 to negative chamber 1490.

Defined by and/or integral to trap body 1100 can be a first port 1540, second port 1560, and/or third port 1580. Second port 1560 can define a central axis 1562. First port 1520 can be configured to direct condensate from positive chamber 1320 into collection chamber 1420. Second port 1540 can be configured to direct condensate received from negative chamber 1490 (which was received from negative input 1240) into collection chamber 1420.

Any condensate that flows into collection chamber 1420 can exit collection chamber 1420 by flowing across the collection chamber bottom 1430, through third port 1580, into drain conduit 1260, and into a drain system (not shown). Collection chamber bottom 1430 can be sloped to encourage substantially complete drainage of collection chamber 1420.

Positive float 1340 can define, include, integrate, and/or be attached to a convex positive float sealing surface 1350 that in cross-section is substantially shaped as a segment of an ellipsoid. If the substantially horizontal (when no condensate is in positive chamber 1320) cross-section of positive float 1340 is substantially round, positive float sealing surface 1350 can resemble a partial or complete hemisphere.

By raising off of first port seat 1542 (which can be stationary, substantially smooth, substantially circular, and/or defined on an positive chamber-facing inner surface of trap body 1100), positive float 1340 can allow condensate to flow out of positive chamber 1320, across first port seat 1542, through first port 1540, and into collection chamber 1420. By making contact with first port seat 1542, positive float sealing surface 1350 can substantially prevent gas from flowing out of positive chamber 1320, through first port 1540, and into collection chamber 1420.

Thus, when little or substantially no condensate is present within trap body 1100, gravity and/or positive pressure force operating on positive float 1340 can push positive float sealing surface 1350 into contact against first port seat 1542 and/or form an operative fluidic seal between positive float 1340 and first port seat 1542. Thereby, gravity and/or positive pressure force operating on positive float 1340 can substantially prevent gases under a positive pressure from escaping the unit via positive chamber 1320, such as through first port 1540, into collection chamber 1420, through third port 1580, out of trap 1000, and/or into drain conduit 1260.

Negative float 1440 can define, include, integrate, and/or be attached to a convex negative float sealing surface 1450 that in cross-section is substantially shaped as an entire or segment of a sphere and/or as an entire or segment of a sphere. For example, negative float 1440 can be a sphere, and thus can define a spherical negative float sealing surface 1450 that can seat on second port seat 1562.

When little or substantially no condensate is present within collection chamber 1420, a negative pressure applied to negative chamber 1490 via lower negative input 1240 can cause negative float sealing surface 1450 of negative float 1440 to be pressed against second port seat 1562 and/or form an operative fluidic seal between negative float sealing surface 1450 and second port seat 1562. Thereby, the negative pressure applied to negative chamber 1490 can substantially prevent gas from collection chamber 1420 from being drawn into negative chamber 1490 and/or negative input 1240 (and thus into the negative side of the unit).

By raising off of second port seat 1562 (which can be stationary, substantially smooth, substantially circular, and/or defined on a collection chamber-facing inner surface of trap body 1100), negative float 1440 can allow condensate that enters trap 1000 via negative input 1240 to flow out of negative chamber 1490, through second port 1560, across at least a portion of second port seat 1562, and into collection chamber 1420. By making contact with second port seat 1562, negative float sealing surface 1450 can substantially prevent gas from flowing out of collection chamber 1420, through second port 1560, into negative chamber 1490, through negative input 1240, and back into a negatively pressured portion of the condensate-producing unit.

The difference in the pressure created by the gas in positive chamber 1320 and the pressure created by the gas in collection chamber 1420 can create a positive differential pressure in positive chamber 1320. That positive differential pressure can be treated as generating a clockwise (when viewed from FIG. 2) positive torque (or moment) that is imposed on positive float 1340 and/or as generating a vertical, downwardly pointing, resultant positive force that imposes on positive float 1340. Because that positive force also is applied to any condensate in positive chamber 1320 (either directly or via positive float 1340), that positive force can be represented as a downward resultant positive condensate force that applies vertically downward along central axis 1544 of first port 1540, that positive condensate force calculated by multiplying the cross-sectional area of first port 1540 by the net applied condensate pressure (which is the positive differential pressure, which is the differential between the pressure in positive chamber 1320 and the pressure in collection chamber 1420).

That resultant positive force can apply orthogonally to, and at a specific orthogonal and/or horizontal first distance from, positive float rotational axis 1380. That first force can be co-axial and/or co-linear with a central axis of first port 1540. When sufficient condensate is present in positive chamber 1320, that condensate can buoyantly act on positive float 1340. That buoyant force can be represented as a resultant, vertical, upwardly pointing second vector that can apply orthogonally to, and at a specific orthogonal and/or horizontal second distance from, positive float rotational axis 1380. Trap 1000 can be configured such that the second distance is greater than the first distance, thereby, when sufficient condensate is in positive chamber 1320, the buoyant torque (or moment) generated by the second force will be greater than than the opposing torque generated by the first force, and thus positive float 1340 will be lifted. Conversely, when sufficient condensate is not in positive chamber 1320, the first vector can generate a greater torque than that (if any) generated by the second vector.

Thus, opposing the positive torque can be a counter-clockwise (when viewed from FIG. 2) buoyant torque created by the upward buoyant force of positive float 1340 when lifted by condensate in positive chamber 1320. That upward buoyant force can be determined by the dimensions of positive float 1340. A resultant buoyant force that is equivalent to that upward buoyant force can be treated as applying at a point halfway along the distance from the positive float rotational axis to the rightmost edge of positive float 1350. Thus, the counter-clockwise (when viewed from FIG. 2) buoyant torque generated by the resultant buoyant force can be found by multiplying the resultant buoyant force by the average perpendicular distance at which the resultant buoyant force is applied from the positive float rotational axis.

For example, if first port 1540 is roughly circular and approximately 0.38 inches in diameter, its area is approximately 0.11 square inches. If the differential in pressure between positive chamber 1320 and collection chamber 1420 is approximately 8 inches water column (approximately 0.29 psi), then the downward force exerted along the centerline of first port 1540 by that pressure differential is approximately 0.032 pounds. If the perpendicular distance from the positive float rotational axis 1380 of positive float 1340 to the centerline of first port 1540 is approximately 0.313 inches, then the positive torque generated by the downward positive condensate force is approximately 0.0093 inch-pounds in a clockwise (when viewed from FIG. 2) direction.

Continuing with the example, assuming positive float 1340 has exterior dimensions of approximately 2.12 inches in width, 1.25 inches in height, and 1 inch in depth, the volume of water it displaces when fully submerged is 2.65 cubic inches. Given that water weighs approximately 62.4 pounds per cubic foot, the fully submerged buoyant force on positive float 1340 is approximately 0.096 pounds. The counter-clockwise (when viewed from FIG. 2) buoyant torque generated by that buoyant force can be treated as occurring at a point halfway between the rightmost edge of positive float 1340 and positive float rotational axis 1380. In this example, the positive float rotational axis is inset 0.25 inches from the leftmost edge of positive float 1340, which has a width of 2.12 inches. Thus, the resultant buoyant force applies at a distance of (2.12÷2)−0.25 inches, or 0.81 inches from positive float rotational axis 1380, thereby generating a buoyant torque of 0.0775 inch-pounds of torque. Combining these two opposing torques results in a net torque of 0.0675 inch-pounds of counter-clockwise torque, and thus positive float 1340 will lift off of its seat when it is fully submerged and subject to the specified pressure differential.

From the above explanation, it can be seen that by the properly choosing the dimensions, locations, and/or spacings for positive float 1340, positive float rotational axis 1380, and/or first port 1540, condensate management trap 1000 can be configured to accommodate a wide range of differential pressures. Such configurations can allow the net buoyant force to be increased by having the distance of the pressure force from the the rotational axis be less than the distance of the buoyant force from the rotational axis. Note that the dimensions of positive float 1340 can be adjusted to "flatten" positive float 1340 in a manner that its height is considerable less than its width, thereby allow the total height of condensation management trap 1000 to be fixed at several inches, no matter what the real-world positive pressure of the condensate source. For example, a trap to accommodate 100 inches of water column could be configured to be no more than 3 inches in height, which can be a considerable savings in the required height of approximately 110 inches for a typical P-trap. More broadly, configurations that can make these features possible can involve any several variables, such as the positive pressure in positive chamber 1320, the dimensions of positive float 1340, the first distance, the second distance, and/or the cross-sectional area of first port 1540, etc.

But condensate management trap 1000 need not be limited to managing the release of condensate from a positive pressure condensate source. Gas, such as ambient air, conditioned air, combustion gas, and/or drain gas, can flow into collection chamber 1420, such as via third port 1580, or if a perfect seal isn't formed by positive float 1340, via first port 1540. Thus, a positive pressure differential can exist between collection chamber 1420 and negative input 1240, such that, unimpeded, gas could flow from collection chamber 1420, through second port 1560, into negative chamber 1490, and toward and/or through negative input 1240. Negative float 1440, which can be shaped as a sphere and/or ball, can be configured to substantially prevent that flow of gas, yet allow condensate that enters trap 1000 via negative input 1240 to flow from negative chamber 1490 and into collection chamber 1420.

Negative float 1440 can define a convex negative float sealing surface 1450 substantially shaped as a segment of an ellipsoid. For example, negative float 1440 can be a sphere, and thus can have a spherical negative float sealing surface 1450 that can seat on second port seat 1562.

When sufficient condensate is present in negative chamber 1490, negative float 1440 can roll and/or slide upwards along negative float guide rail 1480, thereby allowing the condensate to flow out of negative chamber 1490 and into collection chamber 1420. Once the height and/or amount of condensate in negative chamber 1490 has dropped sufficiently, the pressure differential between collection chamber 1420 and negative chamber 1490 can cause negative float 1440 to roll downwards along negative float gide rail 1480 and re-seat at second port 1560. Via its position, orientation, and/or shape, negative float stop 1460 can prevent negative float 1440 from rolling beyond the end of and/or off of negative float guide rail 1480.

Guide rail 1480 can:
extend substantially planarly;
extend substantially parallel to the width of trap body 1100 and/or positive float 1340;
incline generally downward toward second port seat 1562;
be integral to or removable from trap body 1100, and/or operatively:
  bias negative float 1440 generally toward second port seat 1562 when collection chamber 1420 is experiencing a pressure higher than that in negative chamber 1490;
  substantially prevent condensate from being blocked, resisted, and/or deterred from flowing from negative chamber 1490 and into collection chamber 1420; and/or
  allow condensate to exit collection chamber 1420 without substantial impediment while substantially preventing drain air and/or positively pressurized gas from entering negative chamber 1490 from collection chamber 1420.

Certain exemplary embodiments can be configured such that there are essentially no pockets, nooks, and/or crannies for debris to accumulate within trap body 1100. For example, trap 1000 can be configured such that there is no standing water and/or debris carried downward and into drain conduit 1260 with the water flow. The bottom of positive chamber 1320 can be sloped toward first port seat 1542 to encourage discharge of any debris with the condensate, and thereby substantially minimize the potential for debris accumulation near first port seat 1542 or within positive chamber 1320. Similarly, the bottom of collection chamber 1420 can be sloped toward third port 1580 to encourage discharge of any debris with condensate that flows through third port 1580, and thereby substantially minimize the potential for debris accumulation near third port 1580 and/or within collection chamber 1420.

With certain exemplary embodiments, there can be little or substantially no potential for the growth of algae because within trap body 1100 and/or there can be either only transient water or substantially no water within trap body 1100, and thus the interior of trap 1000 and its connecting piping can be essentially algae-free.

Thus, certain exemplary embodiments of condensate management trap 1000 can be configured to remove condensate that arrives from both positive pressure condensate sources and negative pressure condensate sources. Thereby, with certain exemplary embodiments, trap 1000 can be configured such that when there is no condensate production there is substantially no standing water in trap body 1100, and when there is condensate production there is only water (and not gases) that move through trap 1000 and/or into drain conduit 1260.

To further facilitate condensate management, collection chamber 1420 can be configured (e.g., shaped, sloped, etc.) to allow condensate to flow out of the collection chamber 1420 and into drain conduit 1260, thereby eliminating the opportunity for condensate management trap 1000 to freeze.

To facilitate the attachment of trap condensate management trap 1000 to or within a condensating producing unit, condensate management trap 1000 can include a mount 1600 that is defined by and/or integral to body 1100.

Note that any subset of components of condensate management trap 1000 and/or trap body 1100 can be integrated in a manner that they can only be destructively separated and/or can be non-destructively releasably joined. For example, front portion 1140 can be, e.g., glued, solvent welded, laser welded, and/or ultrasonically welded to back portion 1180 and/or to front face 1120. Likewise, back portion 1180 can be, e.g., glued, solvent welded, laser welded, and/or ultrasonically welded to back face 1160. Condensate management trap 1000 can be, e.g., glued, solvent welded, friction fit, and/or threaded into a positive condensate supply conduit, a negative condensate supply conduit, and/or drain line.

More broadly, any portion or component of trap 1000 can be constructed of a rubber, silicone, glass, ceramic, and/or polymer, such as a plastic, PVC, ABS, polycarbonate, glycine, etc. Any portion or component of trap 1000 can be formed by extrusion, casting, transfer molding, blow-molding, injection-molding, thermosetting, thermoforming, stamping, coating, depositing, curing, vacuum forming, milling, machining, cutting, etching, lithographic printing, joining, 3-D printing, and/or additive manufacturing, etc. Unless described otherwise, any portions or components of trap 1000 described herein as coupled can be connected via threading, friction fitting, solvent welding, laser welding, gluing, caulking, soldering, brazing, compression fitting, and/or integration (i.e., formed as a single component), etc. Any portion or component of trap 1000 can have any level of opacity, where a low level of opacity for body 1100 can allow condensate and/or debris within trap 1000 to be observed, while a high level of opacity can hide them. Discussions herein of pressure are described with respect to ambient atmospheric pressure (e.g., approximately 14.7 psia at sea level).

Thus, certain exemplary embodiments can provide a condensate management trap 1000 that is configured to operate dry when the unit is not operating, and when the unit is operating allow condensate to flow from the points of condensate generation within the unit, without substantial impediment through trap 1000, and to a drain, while simultaneously not allowing a substantial quantity of gases to flow through trap 1000.

FIG. 1 is a front perspective view of an exemplary embodiment of condensate management trap 1000, and shows trap body 1100, including front face 1120, which can be permanently or non-destructibly releasably attached to front portion 1140, which can be permanently or non-destructibly releasably attached to back portion 1180, which can be permanently or non-destructibly releasably attached to back face 1160.

Figure 2:
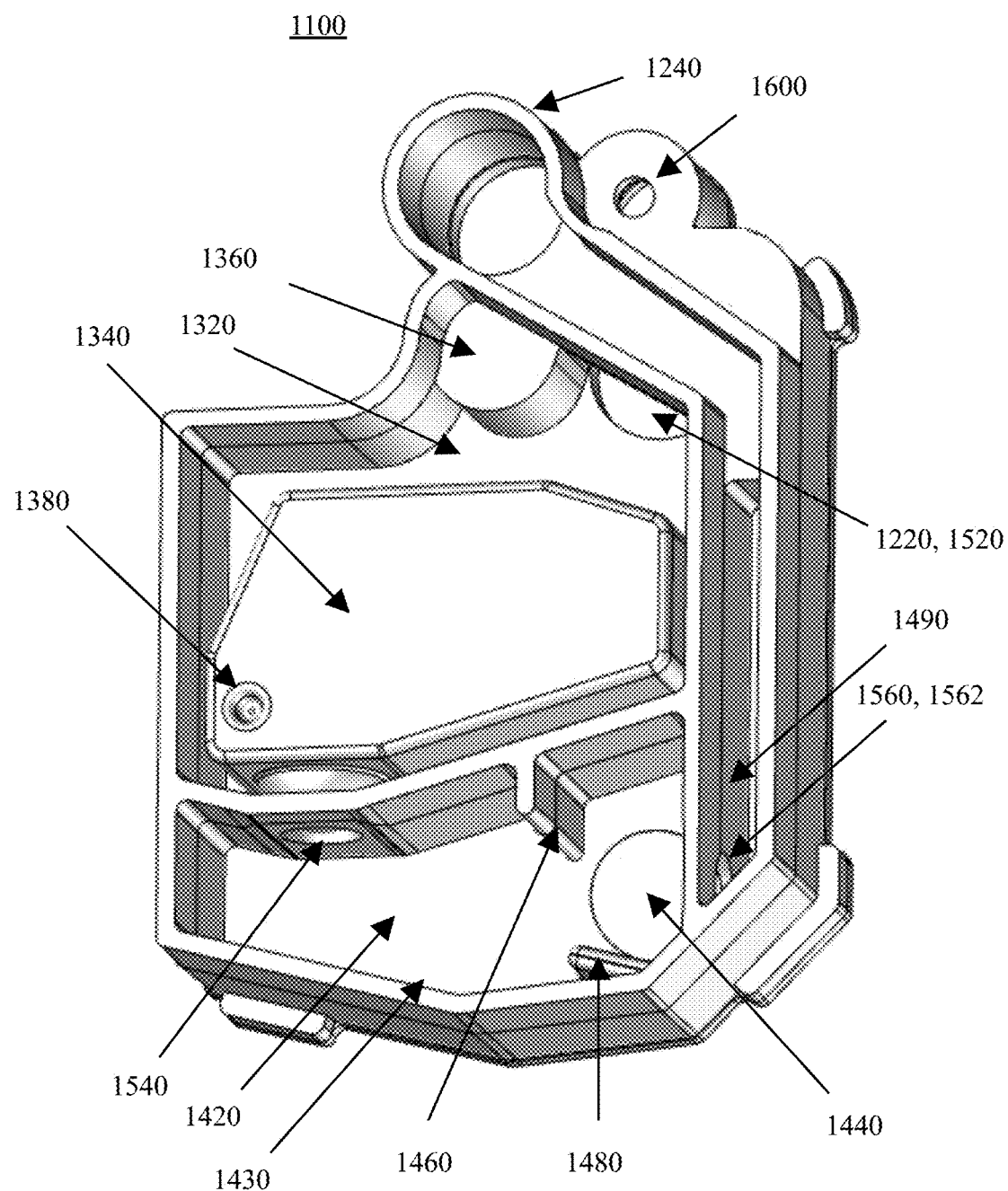
FIG. 2 is a front cross-sectional perspective view, taken at section A-A, of an exemplary embodiment of a condensate management trap.

FIG. 2 is a front cross-sectional perspective view, taken at section A-A, of an exemplary embodiment of condensate management trap 1000. In this cross-sectional view, front face 1120 has been removed to show positive float 1340, positioned such that positive float sealing surface 1350 is in contact with and/or seated on first port seat 1542, and negative float 1440, positioned such that negative float sealing surface 1450 is in contact with and/or seated on second port seat 1562.

Figure 3:
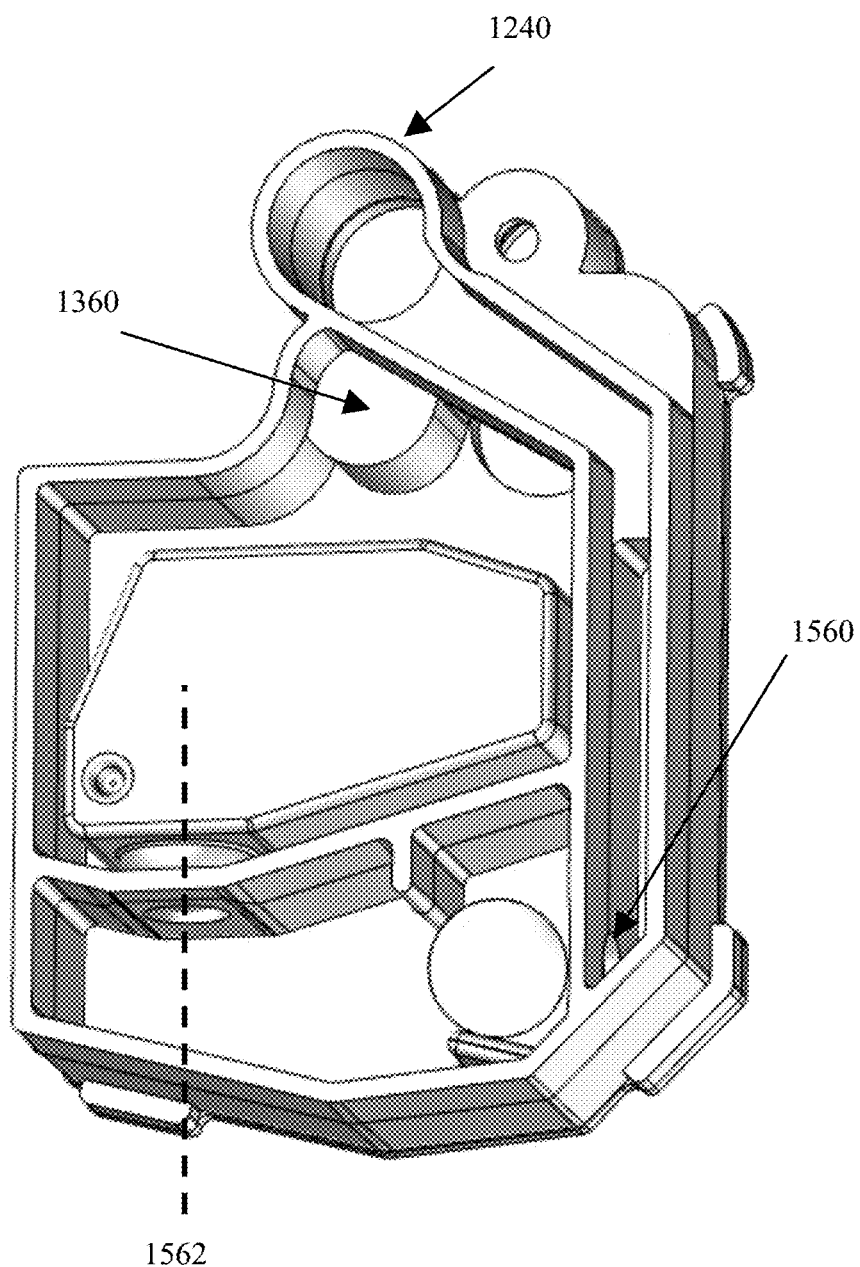
FIG. 3 is a front cross-sectional perspective view, taken at section A-A, of an exemplary embodiment of a condensate management trap.

FIG. 3 is a front cross-sectional perspective view, taken at section A-A, of an exemplary embodiment of condensate management trap 1000. In this cross-sectional view, front face 1120 has been removed to show that first port central axis 1544 is located to the right of positive float rotational axis, and to show negative float 1440 positioned such that negative float sealing surface 1450 is not in contact with and/or seated on second port seat 1562, which can occur when sufficient condensate is present in negative chamber 1490.

Figure 4:
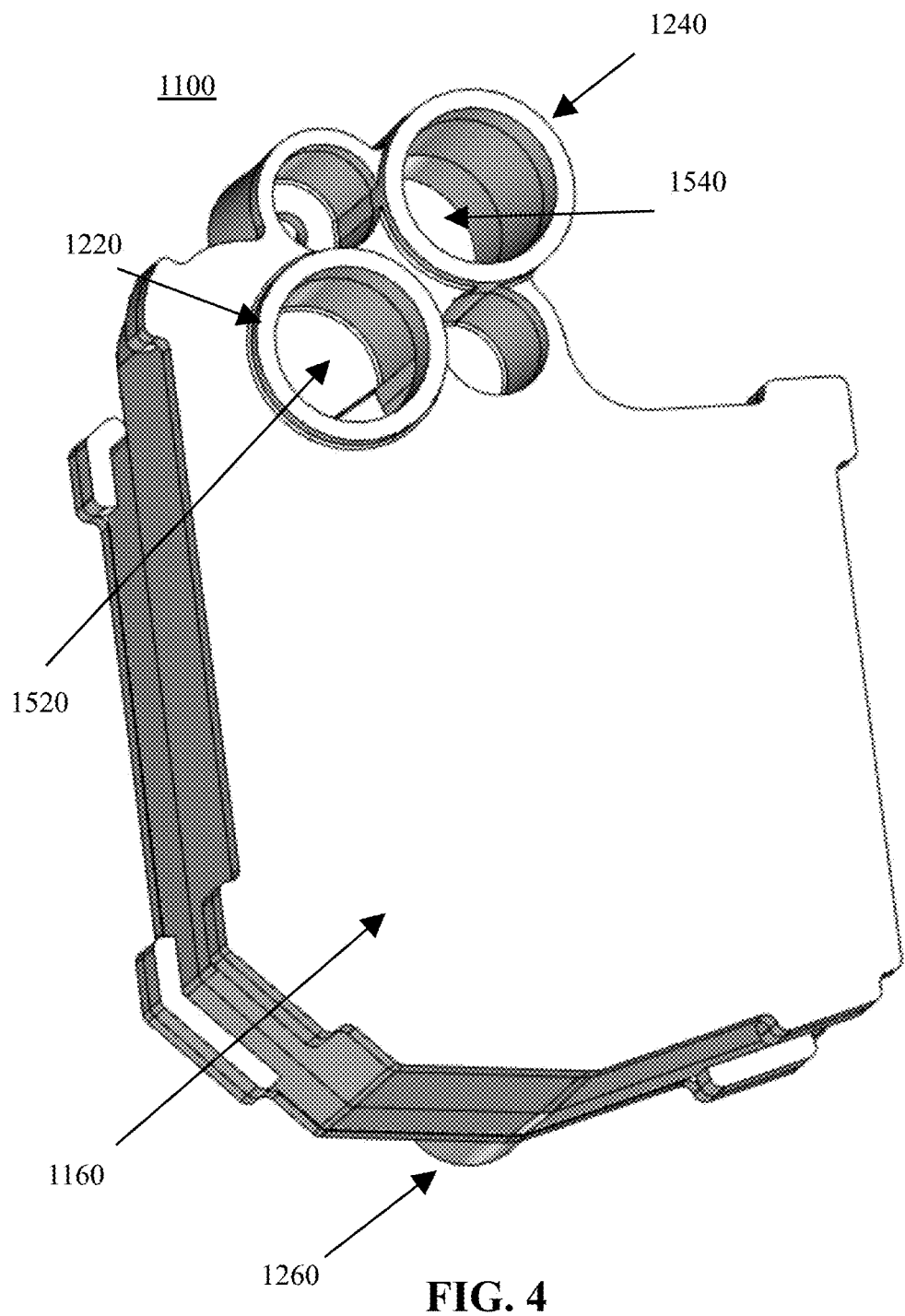
FIG. 4 is a back perspective view of an exemplary embodiment of a condensate management trap.

FIG. 4 is a back perspective view of an exemplary embodiment of condensate management trap 1000, and shows trap body 1100, including back face 1160. Also shown are positive input 1220, negative input 1240, drain conduit 1260, and first port 1540.

Figure 5:
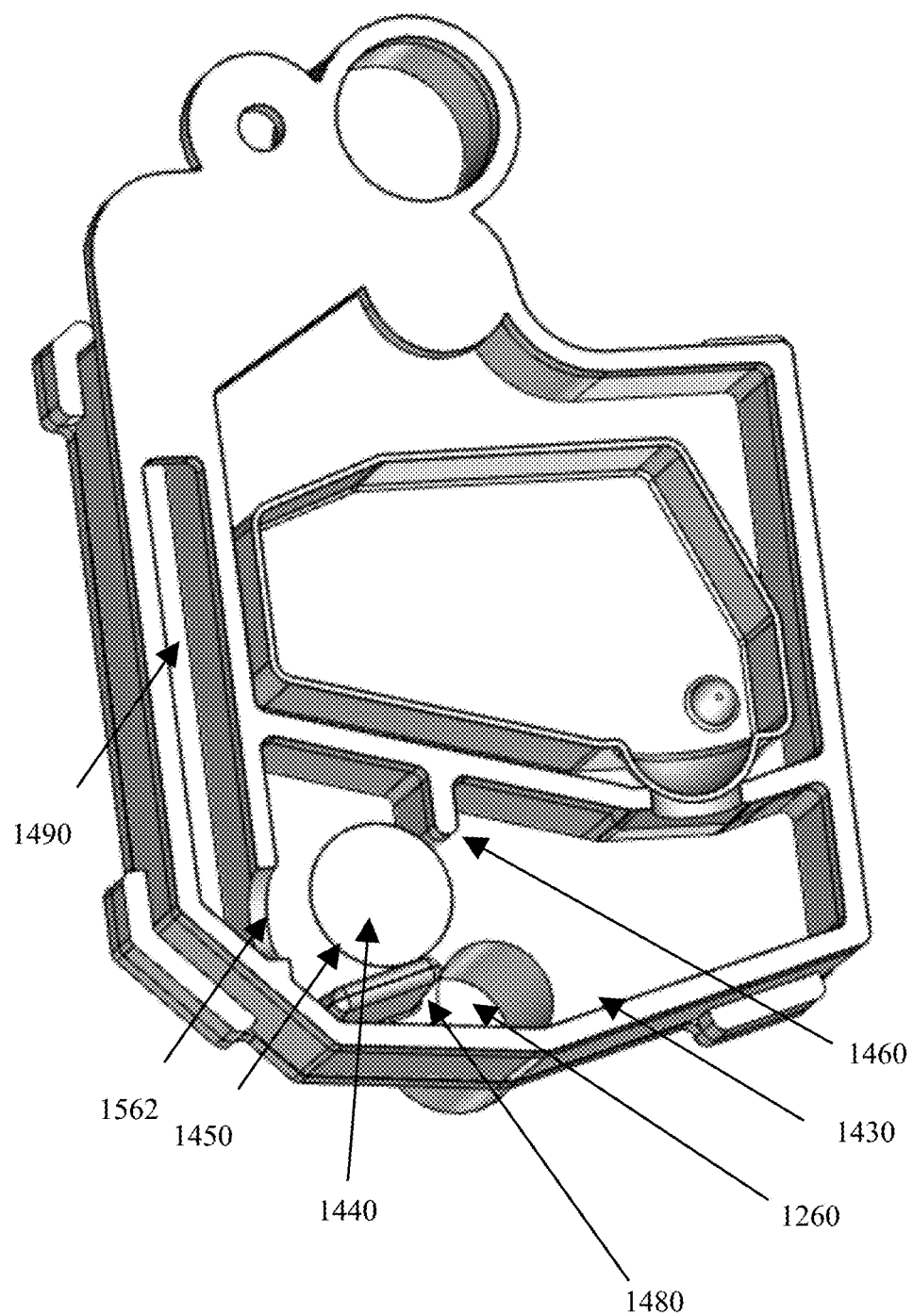
FIG. 5 is a back cross-sectional perspective view, taken at section B-B, of an exemplary embodiment of a condensate management trap.

FIG. 5 is a back cross-sectional perspective view, taken at section B-B, of an exemplary embodiment of condensate management trap 1000, such that back face 1160 and part of back portion 1180 are not visible. Notably, negative float 1440 is positioned such that negative float sealing surface 1450 is not in contact with and/or seated on second port seat 1562, which can occur when sufficient condensate is present in negative chamber 1490.

Figure 6:
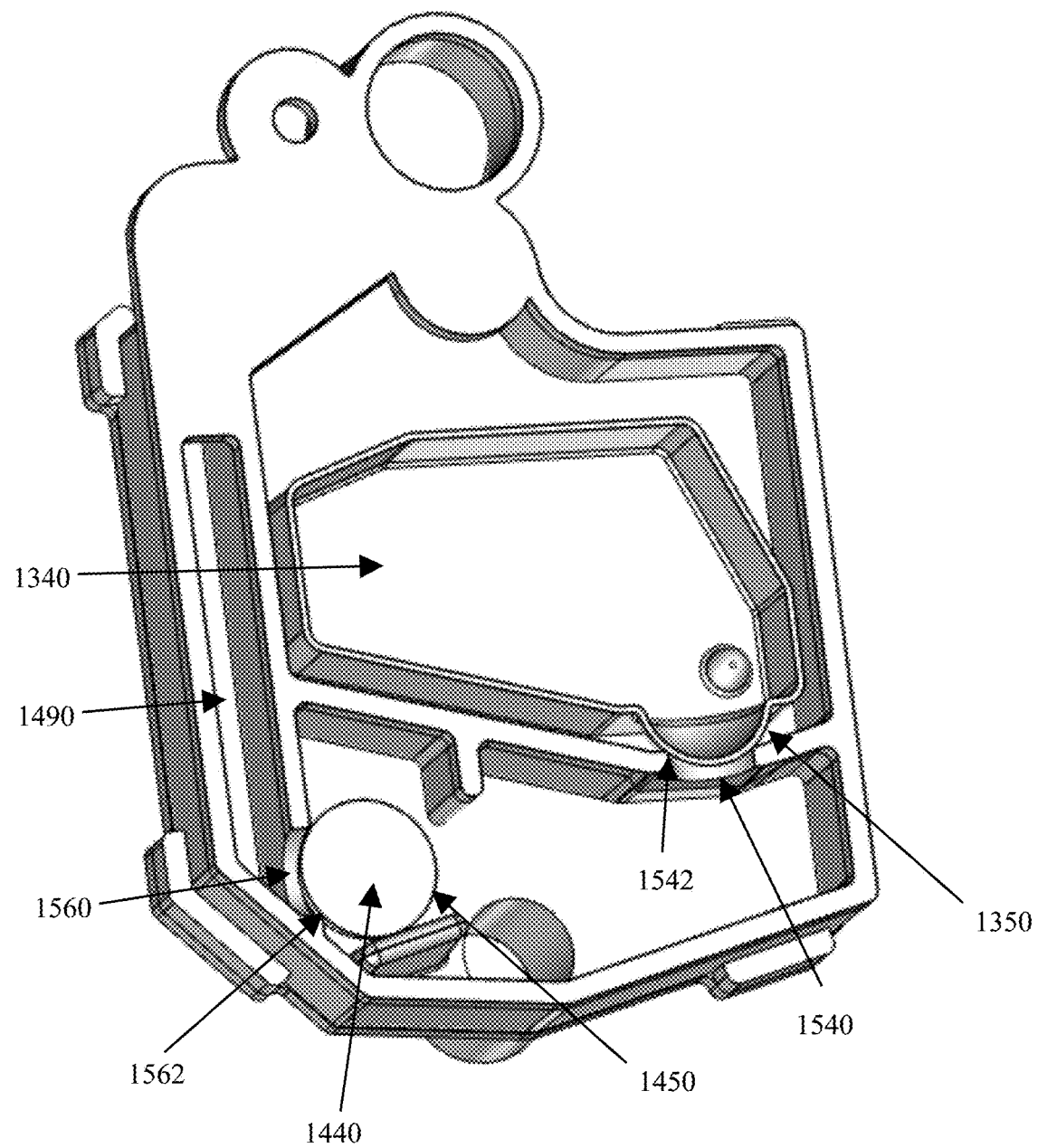
FIG. 6 is a back cross-sectional perspective view, taken at section B-B, of an exemplary embodiment of a condensate management trap.

FIG. 6 is a back cross-sectional perspective view, taken at section B-B, of an exemplary embodiment of condensate management trap 1000, such that back face 1160 and part of back portion 1180 are not visible. Notably, negative float 1440 is positioned such that negative float sealing surface 1450 is in contact with and/or seated on second port seat 1562, which can occur when sufficient condensate is not present in negative chamber 1490.

Figure 7:
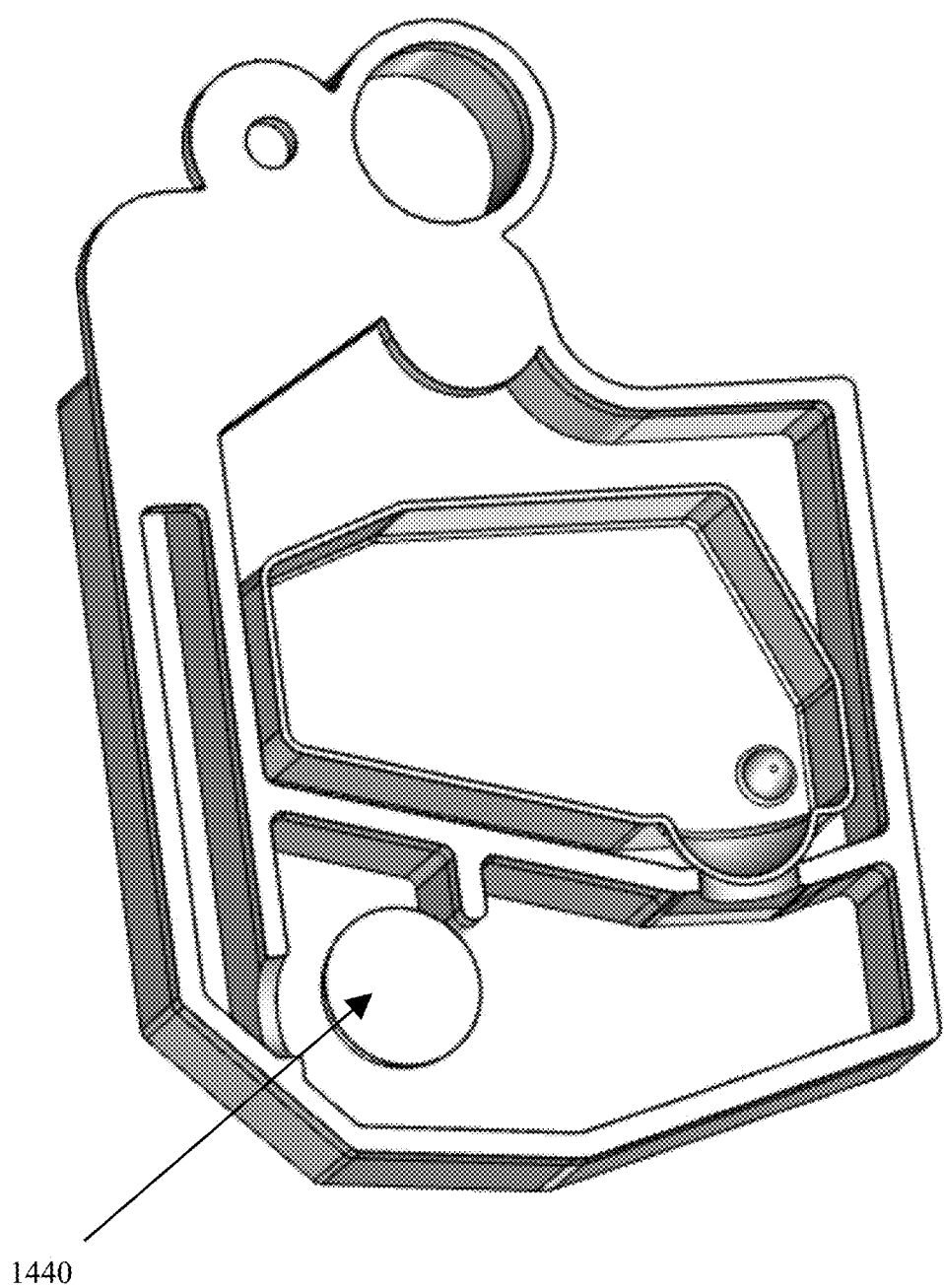
FIG. 7 is a back cross-sectional perspective view, taken at sections A-A and B-B, of an exemplary embodiment of a condensate management trap.

FIG. 7 is a back cross-sectional perspective view, taken at sections A-A and B-B, of an exemplary embodiment of condensate management trap 1000, such that front face 1120, back face 1160, and part of back portion 1180 are not visible. Note that negative float 1440 is not rigidly or fixedly attached to any of front face 1120, front portion 1140, back face 1160, or back portion 1180.

Figure 8:
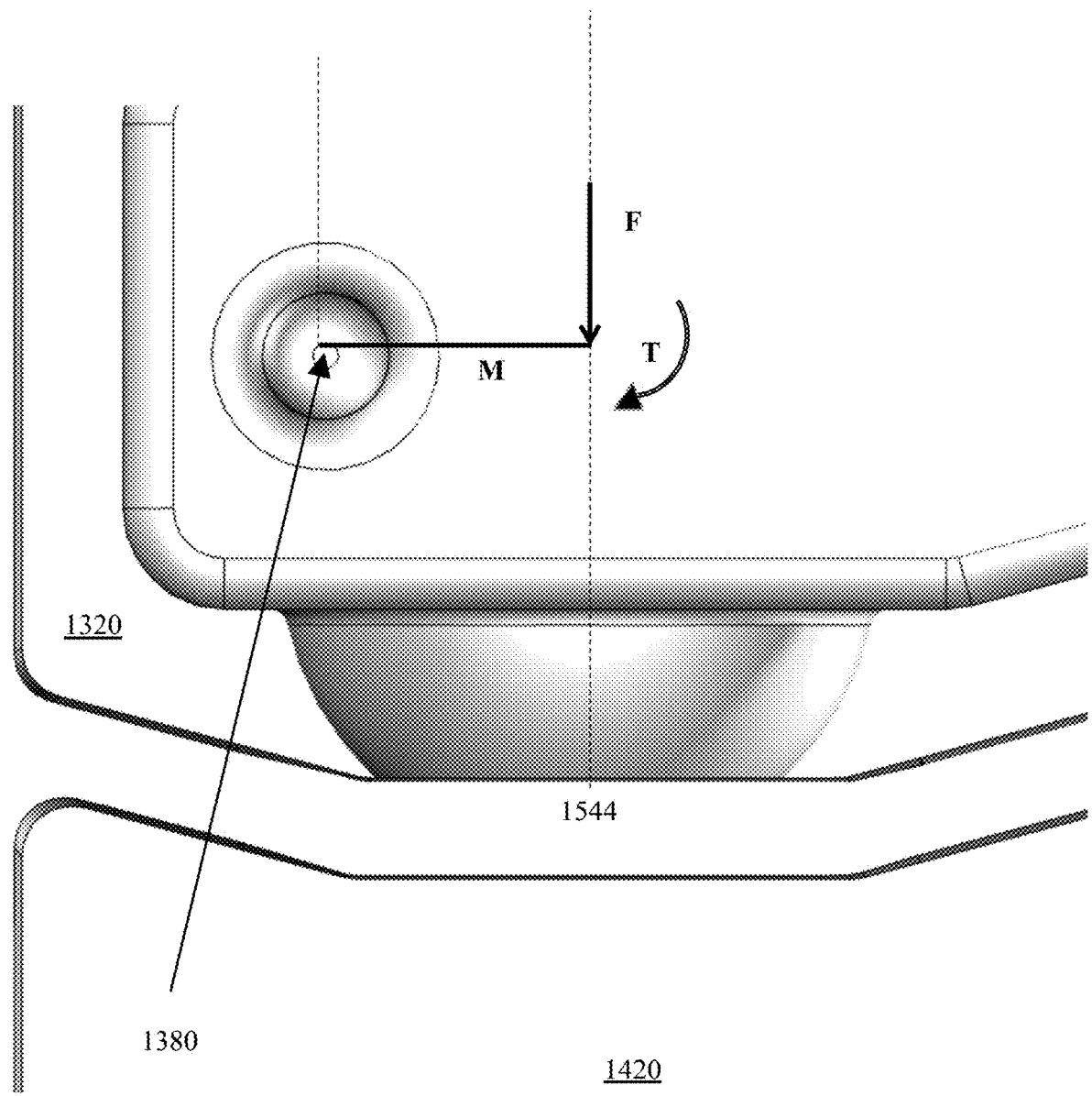
FIG. 8 illustrates a torque generated by an exemplary embodiment of a condensate management trap.

FIG. 8 illustrates how the positive torque T is created based on the differential pressure between positive chamber 1320 and collection chamber 1420, as applied across (i.e., divided by) the cross-sectional first port 1540, to generate a positive force F that applies at a distance or moment arm M that is measured orthogonally between rotational axis 1380 and first port central axis 1544.

Certain exemplary embodiments can provide a device configured to release condensate from a condensate-producing unit to a drain, comprising:
  a positive float;
  negative float;
  a body defining:
    a positive chamber configured to substantially contain the positive float;
    a negative chamber configured to receive condensate from a negative input;
    a collection chamber configured to substantially contain the negative float;
    a first port configured to direct condensate received from the positive chamber into the collection chamber;
    a second port configured to direct condensate received from the negative chamber into the collection chamber; and/or
    a third port configured to direct condensate received from the collection chamber into a drain conduit;
  one or more guide rails attached to or integral with the body and configured to operably bias the negative float toward the second port;
  one or more guide rails attached to or integral with the body and configured to operably bias the negative float toward the second port when condensate within the negative chamber is below a predetermined level;
  one or more guide rails attached to or integral with the body and configured to operably bias the negative float toward the second port when pressure within the negative chamber is below atmospheric pressure;
  one or more guide rails attached to or integral with the body and configured to operably direct the negative float away from the second port when a sufficient amount of condensate is present within the negative chamber;
  one or more negative float stops attached to or integral with the body and configured to operably prevent the negative float from blocking condensate from flowing through the third port;
  one or more positive float stops attached to or integral with the body and configured to prevent the positive float from substantially blocking condensate from flowing into the positive chamber; and/or
  one or more negative float stops attached to or integral with the body and configured to prevent the negative float from substantially blocking condensate from flowing through the second port;
  wherein:
    the positive float is configured to rotate about a rotational axis;
    the positive float is configured to allow condensate to flow out of the positive chamber through the first port and substantially prevent gas from flowing out of the positive chamber via the first port;
    a first distance measured horizontally from the rotational axis and orthogonally intersecting a first vector representing a downward force created by the gas acting on the positive float is less than a second distance measured horizontally from the rotational axis and orthogonally intersecting a second vector representing an upward force caused by condensate in the positive chamber buoyantly acting on the positive float;
    the negative float is configured to allow condensate to flow out of the negative chamber through the second port and/or to substantially prevent gas from flowing out of the collection chamber via the second port; and
    the collection chamber is configured to allow condensate to flow out of the collection chamber through the third port;
    the first vector is coaxial with a central axis of the first port;
    the positive float is defined by, when no condensate is in the positive chamber, a length oriented in a substantially horizontal direction, a height oriented in a substantially vertical direction, and a width oriented substantially orthogonally to the length and to the width, the length and height defining a front face and a back face of the positive float, the length and width defining a top face and a bottom face of the positive float, and the height and width defining, with respect to the front face, a left face and a right face of the positive float;
    the rotational axis passes substantially orthogonally and/or transversely through a front face and a back face of the positive float;
    the positive float is configured to operably form a fluidic seal with a stationary and substantially smooth first port seat defined on an upper inner surface of the positive chamber, the seal formed when substantially no condensate is present within the positive chamber;
    the negative float is configured to operably form a fluidic seal with a stationary and substantially smooth second port seat defined on a lower inner surface of the body, the seal formed when substantially no condensate is present within the negative chamber;
    the negative float is configured to operably form a fluidic seal with a stationary and substantially smooth seat defined on a lower inner surface of the body, the seal formed when substantially no condensate is present at the second port and a relative pressure difference between the collection chamber and the negative chamber is negative;
    the negative float is configured to substantially prevent gas within the collection chamber from flowing into the negative chamber;
    the body is configured to substantially deter condensate from remaining in the positive chamber when condensate is not flowing into the positive chamber;
    the body is configured to substantially deter condensate from remaining in the negative chamber when condensate is not flowing into the negative chamber;
    the body is configured to operably deter debris from accumulating in the positive chamber when condensate is flowing through the first port;
    the body is configured to operably deter debris from accumulating in the negative chamber when condensate is flowing through the second port;

the body is configured to operably deter debris from accumulating in the collection chamber when condensate is flowing through the third port;

the device is configured to prevent gas from flowing from the positive chamber into the collection chamber;

the device is configured to prevent gas from flowing from the collection chamber into the negative chamber;

the positive float defines a convex sealing surface substantially shaped as a segment of an ellipsoid;

the negative float defines a convex sealing surface substantially shaped as a segment of an ellipsoid or as a segment of a sphere;

the positive float is pivotably attached to the body;

the body is unitary; and/or in an operative embodiment, the device is configured such that no condensate remains in the body one hour after cessation of entry of condensate into the body.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

- a—at least one.
- about—around and/or approximately.
- above—at a higher level.
- accumulate—to amass, collect, gather and/or become gathered together in an increasing quantity.
- across—from one side to another.
- activity—an action, act, step, and/or process or portion thereof.
- adapt—to design, make, set up, arrange, shape, configure, and/or make suitable and/or fit for a specific purpose, function, use, and/or situation.
- adapter—a device used to effect operative compatibility between different parts of one or more pieces of an apparatus or system.
- after—following in time and/or subsequent to.
- against—in contact with so as to rest and/or press on, so as to come into forcible contact with, and/or contrary to and/or in a direction and/or course opposite to.
- air—the earth's atmospheric gas.
- allow—to provide, let do, happen, and/or permit.
- along—through, on, beside, over, in line with, and/or parallel to the length and/or direction of; and/or from one end to the other of.
- amount—a quantity.
- an—at least one.
- and—in conjuction with.
- and/or—either in conjunction with or in alternative to.
- annular—shaped like a ring.
- any—one, some, every, and/or all without specification.
- apparatus—an appliance or device for a particular purpose.
- approximately—about and/or nearly the same as.
- are—to exist.
- around—about, surrounding, and/or on substantially all sides of; and/or approximately.
- as long as—if and/or since.
- associate—to join, connect together, and/or relate.
- at—in, on, and/or near.
- at least—not less than, and possibly more than.
- atmospheric pressure—the pressure exerted by the earth's atmosphere at any given point, being the product of the mass of the atmospheric column of the unit area above the given point and of the gravitational acceleration at the given point; typically approximately 14.7 psia.
- attach—to fasten, secure, couple, and/or join.
- attached—joined or secured together.
- away—on a path directed from a predetermined location.
- axis—a straight line about which a body and/or geometric object rotates and/or can be conceived to rotate and/or a center line to which parts of a structure and/or body can be referred.
- back—that portion and/or side that is opposite and/or behind the front.
- ball—a substantially spherical object.
- based on—indicating one or more factors that affect a determination, but not necessarily foreclosing additional factors that might affect that determination.
- below—beneath; in a lower place; and/or less than.
- between—in a separating interval and/or intermediate to.
- bias—n. a tension and/or force; v. to urge and/or force.
- block—(n) an obstacle and/or the act of blocking; (v) to obstruct, stop and/or or impede the passage of and/or movement through; obstruct, and/or to prevent from happening, succeeding, and/or progressing.
- body—a main and/or central part.
- bottom—opposite of top and/or a lowest part of an object relative to a point of reference, the object in a predetermined orientation relative to the point of reference.
- buoyancy—the ability to float in a liquid and/or to rise in a fluid; and/or the upward force that a fluid exerts on an object less dense than itself that is at least partly immersed in the fluid.
- buoyant—having and/or marked by buoyancy.
- by—via and/or with the use and/or help of
- can—is capable of, in at least some embodiments.
- cause—to bring about, provoke, precipitate, produce, elicit, be the reason for, result in, and/or effect.
- cease—to halt and/or stop.
- central—situated at, in, or near the center of a length.
- centroid—the "centroid" or geometric center of a plane figure is the arithmetic mean position of all the points in the figure. The "centroid" of a ring or a bowl, for example, lies in the object's central void.
- chamber—a space and/or compartment that is substantially or at least partially defined and surrounded by one or more objects.
- chamber-facing—having a surface that defines, is in contact with, and/or is adjacent to a chamber.
- circuit—an electrically conductive pathway and/or a communications connection established across two or more switching devices comprised by a network and between corresponding end systems connected to, but not comprised by the network.
- circular—having a cross-section of a circle and/or substantially resembling a round shape.
- clean-out—an access for inspecting, reaching, and/or removing obstructions, debris, and/or contaminants; and/or a pipe fitting containing a removable plug that provides access for inspection and/or cleaning of the pipe run.

closable—able to be repeatedly closed.

close—to alter and/or move an object so that an opening and/or or passage is covered and/or obstructed by the object; to shut; and/or to draw and/or bind together.

coaxial—having and/or mounted on a common axis.

collect—to gather, accumulate, and/or bring together in a group or mass.

collection—an accumulation and/or the act or process of collecting.

combustion—the chemical action resulting from the direct combination of oxygen gas, generally in air, with a combustible material accompanied by the evolution of heat and light.

composition of matter—a combination, reaction product, compound, mixture, formulation, material, and/or composite formed by a human and/or automation from two or more substances and/or elements.

comprising—including but not limited to, what follows.

conceive—to imagine, conceptualize, form, and/or develop in the mind.

condensate—the liquid resulting from condensation of a gas, such as an aqueous solution that condenses from a gas, such as furnace combustion gas.

condensate producing unit—a machine, assembly, apparatus, and/or system that produces condensate. Examples include furnaces, air conditioners, heat pumps, chillers, ice-makers, and dehumidifiers.

conduit—a tube, channel, and/or duct for substantially enclosing electric wires and/or cable.

configure—to design, arrange, set up, shape, and/or make suitable and/or fit for a specific purpose, function, use, and/or situation.

configured to—having a structure that, during operation, will perform the indicated activity(ies). To the extent relevant to the current application, the use of "configured to" is expressly not intended to invoke 35 U.S.C. § 112(f) for that structure.

connect—to join or fasten together.

contact—to physically touch and/or come together.

contain—to store, restrain, hold, and/or keep within limits.

containment—the act of containing, keeping from spreading, and/or directing the flow, motion, and/or spread of.

convert—to transform, adapt, and/or change.

convex—having a surface and/or boundary that curves and/or bulges outward, as the exterior of a sphere; and/or a surface such that for any pair of points on the surface, any point on the straight line segment that joins the pair of points is under the object.

convey—to transmit, transport, guide, and/or carry.

corresponding—related, associated, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

create—to bring into being.

debris—a solid substance and/or the remains of something destroyed, disintegrated, and/or decayed.

define—to establish the meaning, relationship, outline, form, and/or structure of; and/or to precisely and/or distinctly describe and/or specify.

derive—to receive, obtain, and/or produce from a source and/or origin.

deter—to hamper, hinder, delay, interrupt, interfere, oppose, restrict, retard, impede, stop, and/or prevent from doing, acting, happening, and/or progressing.

determine—to find out, obtain, calculate, decide, deduce, ascertain, and/or come to a decision, typically by investigation, reasoning, and/or calculation.

device—a machine, manufacture, and/or collection thereof.

difference—a value obtained via a subtraction of a first quantity from a second quantity.

direct—to point, aim, control, cause, provide instruction to, send toward a place and/or object, and/or cause to move in or follow a predetermined course.

direction—a spatial relation between something and a course along which it points and/or moves; a distance independent relationship between two points in space that specifies the position of either with respect to the other; and/or a relationship by which the alignment and/or orientation of any position with respect to any other position is established.

disconnect—to unattach and/or sever a connection.

distance—a measure of physical and/or logical separation.

drain—(n) a pipe and/or channel that carries off water, liquid, slurry, waste, sewage, etc.; (v) to empty, cause liquid to go out from, draw off (a liquid) by a gradual process, and/or become empty by the drawing off of liquid.

each—every one of a group considered individually.

effective—sufficient to bring about, provoke, elicit, and/or cause.

ellipsoid—a geometric surface, all of whose plane sections are ellipses (note that a circle is a special case of an ellipse); and/or a solid having such a shape.

elongated—drawn out, made spatially longer, and/or having more length than width.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

exit—(n) a path, passage, and/or way leading through an opening and away from an interior of a container; (v) to leave, go away, and/or flow out of.

exterior—a region that is outside of a device and/or system.

extrude—to shape (a plastic, for instance) by forcing it through a die.

first—a label for a referenced element in one or more patent claims, but that label does not necessarily imply any type of ordering to how that element (or any other elements of a similar type) is implemented in embodiments of the claimed subject matter.

float—(n) a buoyant object; (v) to cause to and/or to remain suspended within and/or on the surface of a fluid without sinking.

flow—(n) the act of flowing, a continuous transfer, and/or a stream and/or current; (v) to pour forth, issue in a stream, and/or move and/or run smoothly with unbroken continuity, as in the manner characteristic of a fluid.

flowrate—a measure how much flows over a given time period.

fluid—a liquid, slurry, vapor, mist, cloud, plume, and/or foam, etc.

fluidic—of, relating to, or characteristic of a fluid.

for—with a purpose of force—a capacity to do work and/or cause physical change.

form—(v) to construct, build, generate, and/or create; (n) a phase, structure, and/or appearance.

fourth—a label for an element in one or more patent claims, the element other than a "first" or "second" or "third" referenced element of a similar type, but the label does not necessarily imply any type of ordering to how that "fourth" element is implemented in embodiments of the claimed subject matter.

from—used to indicate a source, origin, and/or location thereof.

front—that portion and/or side that is forward, prominent, and/or most often seen and/or used.

function—to perform as designed when applied.

furnace—a chamber, enclosure, or other holding means for heating materials therein.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container.

generate—to create, produce, give rise to, and/or bring into existence.

given— guide—to direct, steer, and/or exert control and/or influence over; and/or a passive structure configured to direct, resist, and/or prevent the movement of something.

having—including but not limited to.

height—a measurement of the extent of something along an, often substantially vertical, dimension.

horizontal—parallel to and/or in the plane of the horizon.

including—including but not limited to.

initialize—to prepare something for use and/or some future event.

inner—closer than another to the center and/or middle.

install—to connect or set in position and prepare for use.

integral—formed and/or united into another entity.

intersecting—meeting at a point and/or cutting across and/or through.

into—toward, in the direction of, and/or to the inside of.

is—to exist in actuality.

left—opposite of right and/or of and/or designating the side of something and/or someone that faces west when the front is turned towards the north.

length—a longest dimension of something and/or the measurement of the extent of something along its greatest dimension.

less than—having a measurably smaller magnitude and/or degree as compared to something else.

level—a relative position on a scale and/or a position along a vertical axis indicating height and/or depth.

located—situated approximately in a particular spot and/or position.

longitudinal axis—a straight line defined parallel to an object's length and passing through a centroid of the object.

lower—in a position below something else and/or lesser in elevation in relation to something else.

mating—one of a matched pair.

may—is allowed and/or permitted to, in at least some embodiments.

measured—determined, as a dimension, quantification, and/or capacity, etc. by observation.

method—one or more acts that are performed upon subject matter to be transformed to a different state or thing and/or are tied to a particular apparatus, said one or more acts not a fundamental principal and not preempting all uses of a fundamental principal.

more—a quantifier meaning greater in size, amount, extent, and/or degree.

near—a distance of less than approximately [X].

negative—less than zero and/or at a pressure less than atmospheric.

no—an absence of and/or lacking any.

non-destructively—of, relating to, or being a process that does not result in damage to the subject material and/or product and/or results in such minimal damage that the subject material and/or product can be re-used for its intended purpose.

not—a negation of something.

one—being and/or amounting to a single unit, individual, and/or entire thing, item, and/or object.

open—(v) to interrupt, to release from a closed and/or fastened position, to remove obstructions from, to clear, and/or to electrically decouple in a manner to create a gap across which electrical energy cannot readily flow; (adj) not substantially obstructed and/or not closed.

openable—able to be opened.

opening—an open space serving as an aperture, passage, or gap.

operable—practicable and/or fit, ready, and/or configured to be put into its intended use and/or service.

operably—when operating and/or in effect for its intended use and/or service.

operative—when in operation for its intended use and/or service.

or—a conjunction used to indicate alternatives, typically appearing only before the last item in a group of alternative items.

orient—to position a first object relative to a second object.

orthogonal—perpendicular and/or at a right angle to.

other—a different and/or distinct entity and/or not the same as already mentioned and/or implied.

out—in a direction away from the inside, center, and/or middle, such as a container and/or source.

outside—beyond a range, boundary, and/or limit; and/or not within.

overall—total, combined, and/or cumulative effect.

part—a component.

passes—runs and/or extends.

per—for each and/or by means of.

pipe—a hollow cylinder and/or tube used to conduct a liquid, gas, and/or finely divided solid.

pivot—(v) to rotate, revolve, and/or turn; (n) the act of turning on a pivot and/or a short rod or shaft on which a related part rotates and/or or swings.

plurality—the state of being plural and/or more than one.

port—an opening for the insertion and/or passage of an object and/or fluid.

portion—a part, component, section, percentage, ratio, and/or quantity that is less than a larger whole.

positive—greater than zero and/or at a pressure greater than atmospheric.

pre-—a prefix that precedes an activity that has occurred beforehand and/or in advance.

predetermine—to determine, decide, and/or establish in advance.

present—existing.
pressure—a measure of force applied uniformly over a surface.
prevent—to impede, resist, hinder, avert, deter, stop, and/or keep from happening.
prior—before and/or preceding in time or order.
probability—a quantitative representation of a likelihood of an occurrence.
product—something produced by human and/or mechanical effort.
project—to calculate, estimate, or predict.
provide—to furnish, supply, give, and/or make available.
rail—a guide, running surface, bar, and/or member configured for supporting and/or guiding another thing.
range—a measure of an extent of a set of values and/or an amount and/or extent of variation.
ratio—a relationship between two quantities expressed as a quotient of one divided by the other.
receive—to gather, take, acquire, obtain, accept, get, and/or have bestowed upon.
recommend—to suggest, praise, commend, and/or endorse.
reduce—to make and/or become lesser and/or smaller.
relative—considered with reference to and/or in comparison to something else.
release—to let go and/or free from something that restrains, binds, fastens, and/or holds back.
remain—to continue to be in the same place; to stay or stay behind; and/or to be left after the removal, loss, passage, or destruction of other.
remove—to eliminate, remove, and/or delete, and/or to move from a place or position occupied.
repeat—to do again and/or perform again.
repeatedly—again and again; repetitively.
request—to express a desire for and/or ask for.
result—(n.) an outcome and/or consequence of a particular action, operation, and/or course; (v.) to cause an outcome and/or consequence of a particular action, operation, and/or course.
retain—to restrain, keep, and/or hold.
right—opposite of left and/or of and/or designating the side of something and/or someone that faces east when the front is turned towards the north.
rightward—toward the right.
ring—a substantially toroidal object which can be imagined as having been generated by rotating a closed loop (e.g., ellipse, circle, irregular curve, polygon, etc.) about a fixed line external to the loop.
rotational—about and/or around an axis.
said—when used in a system or device claim, an article indicating a subsequent claim term that has been previously introduced.
seal—(v.) to shut close; to keep close; to make fast; to keep secure; to prevent leakage; (n.) a device configured to shut close; to keep close; to make fast; to keep secure; and/or to prevent leakage.
seat—(n) a sealing, supporting, and/or mating surface; (v) to attach to, seal against, support with, and/or bring firmly into contact with.
second—a label for an element in one or more patent claims, the element other than a "first" referenced element of a similar type, but the label does not necessarily imply any type of ordering to how that "second" element or the "first" element is implemented in embodiments of the claimed subject matter.
segment—all co-linear points located between and including two points.
select—to make a choice or selection from alternatives.
set—a related plurality.
shape—a characteristic surface, outline, and/or contour of an entity.
slope—(v) to position at an angle and/or incline with respect to vertical or horizontal; (n) an inclined line, surface, plane, position, and/or direction; and/or with respect to a first point and a second point that are intersected by a straight line, a ratio of the change in the ordinal value from the first point to the second point, to the change in the abscissal value from the first point to the second point; and/or a measure of a degree of inclination; and/or a rate of change.
smooth—lacking substantial surface irregularities, roughness, and/or projections.
source—a point and/or thing at or from which something originates, springs into being, and/or from which it derives and/or is obtained.
species—a class of individuals and/or objects grouped by virtue of their common attributes and assigned a common name; a division subordinate to a genus.
spherical—having the shape of, or substantially resembling, a sphere.
stationary—substantially fixed with respect to an object of reference.
stop—(n) a device and/or means that obstructs, blocks, deters, and/or plugs up; (v) to interrupt, cease and/or end, and/or to block and/or prevent the flow or passage of.
store—to place, hold, and/or retain data, typically in a memory.
stream—a flow of water and/or other fluid
substantially—to a considerable, large, and/or great, but not necessarily whole and/or entire, extent and/or degree.
such that—in a manner that results in.
sufficient—a degree and/or amount necessary to achieve a predetermined result.
support—to bear the weight of, especially from below.
surface—an outer boundary of a body, object, and/or thing and/or any material layer and/or face constituting and/or resembling such a boundary.
system—a collection of mechanisms, devices, machines, articles of manufacture, processes, data, and/or instructions, the collection designed to perform one or more specific functions.
that—used as the subject or object of a relative clause.
therein—within.
third—a label for an element in one or more patent claims, the element other than a "first" or "second" referenced element of a similar type, but the label does not necessarily imply any type of ordering to how that "third" element is implemented in embodiments of the claimed subject matter.
through—across, among, between, and/or in one side and out the opposite and/or another side of
to—a preposition adapted for use for expressing purpose.
toward—used to indicate a destination and/or in a physical and/or logical direction of.
transform—to change in measurable: form, appearance, nature, and/or character.
transmit—to send as a signal, provide, furnish, and/or supply.
trap—a device configured for sealing a passage against the escape of gases.

treatment—an act, manner, or method of handling and/or dealing with someone and/or something.

two—a cardinal number equal to one plus one.

unitary—whole, not separated, and/or having the nature of a unit.

upon—immediately or very soon after; and/or on the occasion of.

upper—in a high position relative to something else.

upward—toward and/or facing up and/or a top.

use—to put into service.

vector—an expression characterized by a magnitude and a direction.

vertical—substantially perpendicular to horizontal.

via—by way of, with, and/or utilizing.

volume—a mass and/or a three-dimensional region that an object and/or substance occupies.

wall—a partition, structure, and/or mass that serves to enclose, divide, separate, segregate, define, and/or protect a volume.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

width—a measurement of the extent of something along an, often substantially horizontal, dimension.

with—accompanied by.

with regard to—about, regarding, relative to, and/or in relation to.

with respect to—about, regarding, relative to, and/or in relation to.

within—inside the limits of.

without—not accompanied by.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A device configured to release condensate from a condensate-producing unit to a drain, comprising:
    a positive float;
    negative float; and
    a body defining:
        a positive chamber configured to substantially contain the positive float;
        a negative chamber configured to receive condensate from a negative input;
        a collection chamber configured to substantially contain the negative float;
        a first port configured to direct condensate received from the positive chamber into the collection chamber;
        a second port configured to direct condensate received from the negative chamber into the collection chamber;
        a third port configured to direct condensate received from the collection chamber into a drain conduit;
    wherein:
    the positive float is configured to rotate about a rotational axis;
    the positive float is configured to allow condensate to flow out of the positive chamber through the first port and substantially prevent gas from flowing out of the positive chamber via the first port;
    a first distance measured horizontally from the rotational axis and orthogonally intersecting a first vector representing a downward force created by the gas acting on the positive float is less than a second distance measured horizontally from the rotational axis and orthogonally intersecting a second vector representing an upward force caused by condensate in the positive chamber buoyantly acting on the positive float;
    the negative float is configured to allow condensate to flow out of the negative chamber through the second port and to substantially prevent gas from flowing out of the collection chamber via the second port; and
    the collection chamber is configured to allow condensate to flow out of the collection chamber through the third port.

2. The device of claim 1, wherein:
the first vector is coaxial with a central axis of the first port.

3. The device of claim 1, wherein:
the positive float is defined by, when no condensate is in the positive chamber, a length oriented in a substantially horizontal direction, a height oriented in a substantially vertical direction, and a width oriented substantially orthogonally to the length and to the width, the length and height defining a front face and a back face of the positive float, the length and width defining a top face and a bottom face of the positive float, and the height and width defining, with respect to the front face, a left face and a right face of the positive float.

4. The device of claim 1, wherein:
the rotational axis passes substantially orthogonally through a front face and a back face of the positive float.

5. The device of claim 1, wherein:
the positive float is configured to operably form a fluidic seal with a stationary and substantially smooth first port seat defined on an upper inner surface of the positive chamber, the seal formed when substantially no condensate is present within the positive chamber.

6. The device of claim 1, wherein:
the negative float is configured to operably form a fluidic seal with a stationary and substantially smooth second port seat defined on a lower inner surface of the body, the seal formed when substantially no condensate is present within the negative chamber.

7. The device of claim 1, wherein:
the negative float is configured to operably form a fluidic seal with a stationary and substantially smooth seat defined on a lower inner surface of the body, the seal formed when substantially no condensate is present at the second port and a relative pressure difference between the collection chamber and the negative chamber is negative.

8. The device of claim 1, further comprising:
one or more guide rails attached to or integral with the body and configured to operably bias the negative float toward the second port.

9. The device of claim 1, further comprising:
one or more guide rails attached to or integral with the body and configured to operably bias the negative float toward the second port when condensate within the negative chamber is below a predetermined level.

10. The device of claim 1, further comprising:
one or more guide rails attached to or integral with the body and configured to operably bias the negative float toward the second port when pressure within the negative chamber is below atmospheric pressure.

11. The device of claim 1, further comprising:
one or more guide rails attached to or integral with the body and configured to operably direct the negative float away from the second port when a sufficient amount of condensate is present within the negative chamber.

12. The device of claim 1, further comprising:
one or more negative float stops attached to or integral with the body and configured to operably prevent the negative float from blocking condensate from flowing through the second port.

13. The device of claim 1, wherein:
the body is configured to substantially deter condensate from remaining in the positive chamber when condensate is not flowing into the positive chamber.

14. The device of claim 1, wherein:
the body is configured to substantially deter condensate from remaining in the negative chamber when condensate is not flowing into the negative chamber.

15. The device of claim 1, wherein:
the body is configured to operably deter debris from accumulating in the positive chamber when condensate is flowing through the first port.

16. The device of claim 1, wherein;
the body is configure to operably deter debris from accumulating in the negative pressure chamber when condensate is flowing through the second port.

17. The device of claim 1, wherein:
the body is configured to operably deter debris from accumulating in the collection chamber when condensate is flowing through the third port.

18. The device of claim 1, further comprising:
one or more positive float stops attached to or integral with the body and configured to prevent the positive float from substantially blocking condensate from flowing into the positive chamber.

19. The device of claim 1, further comprising:
one or more negative float stops attached to or integral with the body and configured to prevent the negative float from substantially blocking condensate from flowing through the second port.

20. The device of claim 1, wherein:
the positive float defines a convex sealing surface substantially shaped as a segment of an ellipsoid.

21. The device of claim 1, wherein:
the negative float defines a convex sealing surface substantially shaped as a segment of an ellipsoid or as a segment of a sphere.

22. The device of claim 1, wherein:
the positive float is pivotably attached to the body.

23. The device of claim 1, wherein:
the body is unitary.

24. The device of claim 1 wherein:
in an operative embodiment, the device is configured such that no condensate remains in the body one hour after cessation of entry of condensate into the body.

* * * * *